United States Patent
Gaya

(10) Patent No.: US 8,843,530 B2
(45) Date of Patent: *Sep. 23, 2014

(54) CONFIGURABLE OFFLINE DATA STORE

(71) Applicant: Apple Inc., Cupertino, CA (US)

(72) Inventor: Bruce Gaya, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/734,752

(22) Filed: Jan. 4, 2013

(65) Prior Publication Data

US 2013/0124580 A1    May 16, 2013

Related U.S. Application Data

(60) Continuation of application No. 12/815,231, filed on Jun. 14, 2010, now Pat. No. 8,352,520, which is a division of application No. 10/435,526, filed on May 9, 2003, now Pat. No. 7,739,363.

(51) Int. Cl.
*G06F 7/00* (2006.01)
*G06F 17/30* (2006.01)
*H04L 29/08* (2006.01)
*H04L 29/06* (2006.01)
*G06Q 20/20* (2012.01)
*G06Q 20/38* (2012.01)

(52) U.S. Cl.
CPC ...... *H04L 29/06047* (2013.01); *H04L 67/2852* (2013.01); *G06F 17/30312* (2013.01); *G06Q 20/204* (2013.01); *G06Q 20/382* (2013.01); *H04L 67/2847* (2013.01)
USPC ...................................... 707/812

(58) Field of Classification Search
None
See application file for complete search history.

(56) References Cited

U.S. PATENT DOCUMENTS

| 6,085,235 | A | 7/2000 | Clarke, Jr. et al. | |
|---|---|---|---|---|
| 7,020,696 | B1 * | 3/2006 | Perry et al. | 709/223 |
| 7,155,403 | B2 | 12/2006 | Cirulli et al. | |
| 7,290,018 | B2 | 10/2007 | Muecklich et al. | |
| 7,761,871 | B2 * | 7/2010 | Edwards et al. | 717/176 |
| 2001/0034733 | A1 * | 10/2001 | Prompt et al. | 707/102 |
| 2001/0034771 | A1 * | 10/2001 | Hutsch et al. | 709/217 |
| 2002/0002468 | A1 * | 1/2002 | Spagna et al. | 705/1 |
| 2002/0059425 | A1 * | 5/2002 | Belfiore et al. | 709/226 |
| 2002/0069100 | A1 | 6/2002 | Arberman | |
| 2002/0069192 | A1 * | 6/2002 | Aegerter | 707/1 |
| 2002/0095436 | A1 | 7/2002 | Lee | |
| 2002/0103737 | A1 | 8/2002 | Briere | |
| 2002/0103889 | A1 * | 8/2002 | Markson et al. | 709/223 |
| 2002/0118954 | A1 * | 8/2002 | Barton et al. | 386/83 |

(Continued)

*Primary Examiner* — Robert Beausoliel, Jr.
*Assistant Examiner* — Nicholas Allen
(74) *Attorney, Agent, or Firm* — Womble Carlyle Sandridge & Rice, LLP

(57) ABSTRACT

A method and apparatus for a configurable offline data store are described. For example, a method includes receiving a request for a first set of one or more records from a client application, wherein the first set is stored in a client data store and the client application also has access to a server data store unit of a server. The method further includes determining whether a first set of records in the client data store unit is valid; and upon determining the first set is valid, deleting those records of the first set in the client data store unit that are outdated. The method further includes upon determining the first set is not valid, deleting the first set; determining whether the record is in the client data store unit; and upon determining the record is in the client data store, transmitting a version of the record to the client application.

20 Claims, 16 Drawing Sheets

(56) References Cited

U.S. PATENT DOCUMENTS

| | | |
|---|---|---|
| 2002/0138281 A1 | 9/2002 | Cirulli et al. |
| 2003/0004964 A1* | 1/2003 | Cameron et al. ............ 707/103 R |
| 2003/0014468 A1* | 1/2003 | Sudhakaran et al. .......... 709/104 |
| 2003/0055828 A1* | 3/2003 | Koch et al. ........................ 707/10 |
| 2003/0058277 A1* | 3/2003 | Bowman-Amuah ........... 345/765 |
| 2003/0069874 A1* | 4/2003 | Hertzog et al. ..................... 707/1 |
| 2003/0105644 A1* | 6/2003 | Ali et al. .............................. 705/1 |
| 2003/0105858 A1* | 6/2003 | Hogg et al. ...................... 709/224 |
| 2003/0149526 A1* | 8/2003 | Zhou et al. ...................... 701/213 |
| 2003/0167356 A1* | 9/2003 | Smith et al. ..................... 709/328 |
| 2003/0177139 A1* | 9/2003 | Cameron et al. ............ 707/103 R |
| 2003/0182327 A1 | 9/2003 | Ramanujam et al. |
| 2003/0229543 A1* | 12/2003 | Zimmerman et al. ............ 705/26 |
| 2004/0054648 A1* | 3/2004 | Mogi et al. ......................... 707/1 |
| 2005/0203910 A1* | 9/2005 | Taguchi et al. ................... 707/10 |
| 2006/0215569 A1* | 9/2006 | Khosravy et al. .............. 370/241 |
| 2006/0294086 A1* | 12/2006 | Rose et al. ......................... 707/3 |
| 2007/0038610 A1* | 2/2007 | Omoigui ............................ 707/3 |
| 2007/0248230 A1 | 10/2007 | Shevmov et al. |
| 2008/0044016 A1* | 2/2008 | Henzinger ....................... 380/201 |
| 2009/0106353 A1* | 4/2009 | Belovich ......................... 709/203 |
| 2009/0280906 A1* | 11/2009 | Larsen et al. ..................... 463/42 |
| 2009/0280907 A1* | 11/2009 | Larsen et al. ..................... 463/42 |
| 2010/0250671 A1 | 9/2010 | Gaya |
| 2011/0307440 A1* | 12/2011 | Panchenko ...................... 707/600 |
| 2012/0066204 A1* | 3/2012 | Ball et al. ....................... 707/713 |

* cited by examiner

| NAME | MCX_CACHE |
|---|---|
| TYPE | CONFIG |
| DATA_STORE_ID | <UNIQUE STRING> |
| DATA_STORE_CHANGE_ID | <UNIQUE STRING> |

← CONFIGURATION RECORD 402

CONFIGURABLE OFFLINE DATA STORE

CROSS-REFERENCES TO RELATED APPLICATIONS

This present application is a continuation of application Ser. No. 12/815,231 filed Jun. 14, 2010, which is a divisional of application Ser. No. 10/435,526, filed May 9, 2003, the contents of which are incorporated herein by reference in its entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to distributed computers and more particularly to the management of distributed computers.

BACKGROUND

Computers are very powerful and versatile. They are capable of running a great variety of software for performing many functions and accessing remote information over a network, such as the Internet. Computers are also becoming ever more mobile.

Administrators who manage academic or business computers recognize that granting unfettered power and options to users may distract them from numerous other tasks. Further, administrators may find it difficult to manage a computing environment in which users frequently move between multiple networks.

Computer users that frequently move between networks may find that different networks offer different resources. Thus mobile users may often go without certain vital network resources. Also, mobile network users may frequently access network connection information, security information, and resource information when moving between networks. This frequent access can slow a user's performance by using excessive network and processor bandwidth.

Thus, administrators may want the capability to administer remote computers, whether the remote computers are on or off a network. Further, remote computer users may want to reduce network and processor bandwidth use by processes for accessing network information. Additionally they may want access to network resources while not on the same network where the resource resides.

SUMMARY

A method and apparatus for a configurable offline data store are described herein. In one embodiment, the method includes receiving a request for a first set of one or more records from a client application, wherein the first set is remotely stored. The method further includes determining a second set of one or more records that is associated with the first set, wherein the second set is remotely stored. The method further includes fetching over a network the first set and the second set from a server data store unit; storing the first set and the second set in a client data store unit and providing access to the first set and the second set when the network is not operational.

In one embodiment the apparatus includes a processor, a memory unit coupled to the processor, and a client data store unit to store records including copies of records of a server data store. The apparatus also includes a client data store administration unit coupled to the client data store unit including a dependency schema to define relationships between primary record types and dependent record types.

BRIEF DESCRIPTION OF THE DRAWINGS

The present invention is illustrated by way of example and not limitation in the Figures of the accompanying drawings, in which like references indicate similar elements and in which.

DESCRIPTION OF THE EMBODIMENTS

A method and apparatus for a configurable offline data store is described herein. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

This description of the embodiments is divided into four sections. In the first section, an exemplary hardware and operating environment is described. In the second section, a system level overview is presented. In the third section, methods for using exemplary embodiments are described. In the fourth section, an exemplary implementation is described.

Hardware and Operating Environment

This section provides an overview of the exemplary hardware and the operating environment in which embodiments of the invention can be practiced.

Figure 1:
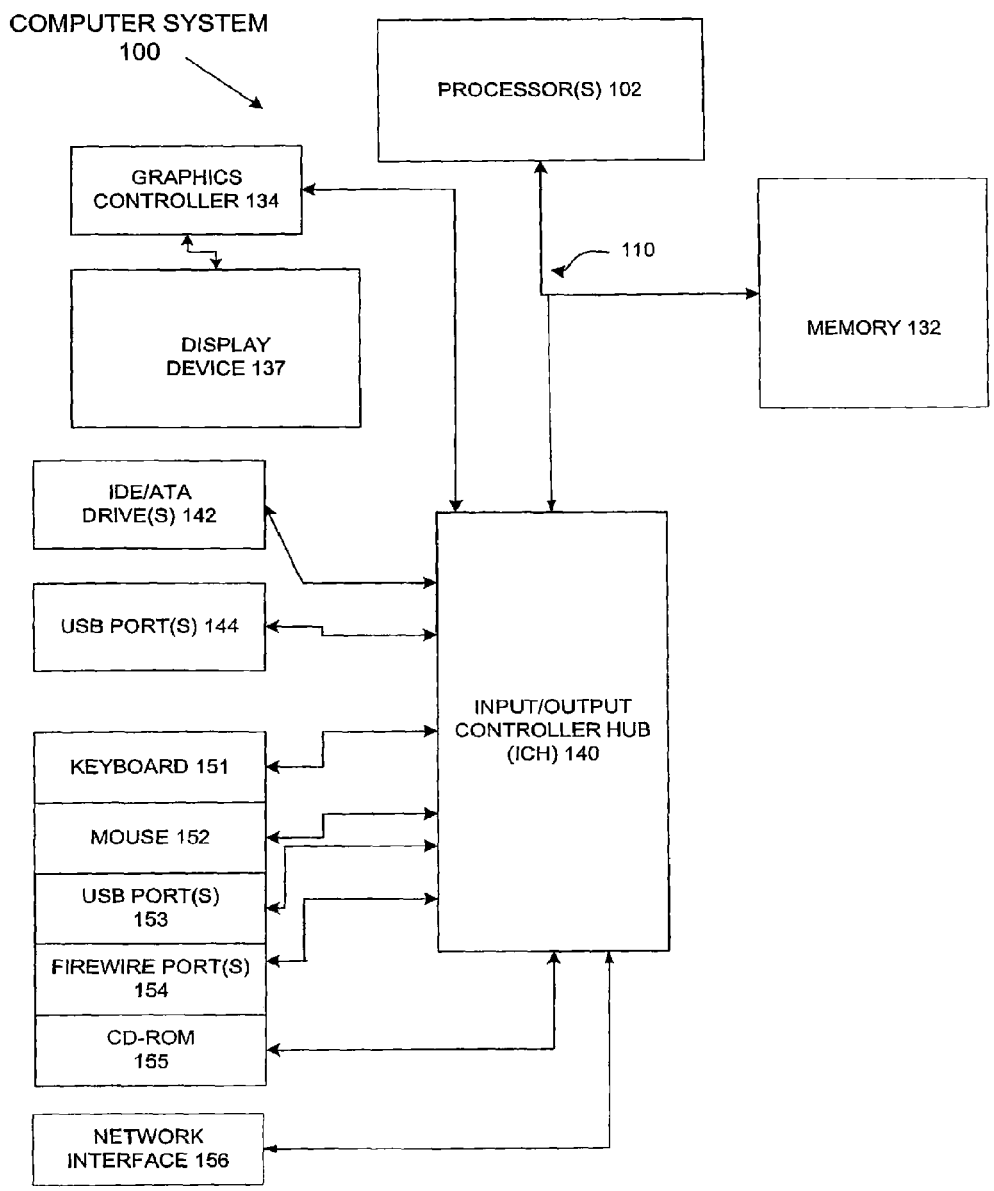
FIG. 1 illustrates an exemplary computer system used in conjunction with certain embodiments of the invention.

FIG. 1 illustrates an exemplary computer system used in conjunction with certain embodiments of the invention. As illustrated in FIG. 1, computer system 100 comprises processor(s) 102. Computer system 100 also includes a memory 132, processor bus 110 and input/output controller hub (ICH) 140. The processor(s) 102, memory 132 and ICH 140 are coupled to the processor bus 110. The processor(s) 102 may comprise any suitable processor architecture. For other embodiments of the invention, computer system 100 may comprise one, two, three, or more processors, any of which may execute a set of instructions that are in accordance with embodiments of the present invention.

The memory 132 stores data and/or instructions, and may comprise any suitable memory, such as a dynamic random access memory (DRAM), for example. The computer system 100 also includes IDE/ATA drive(s) 142 and/or other suitable storage devices. A graphics controller 134 controls the display of information on a display device 137, according to embodiments of the invention.

The input/output controller hub (ICH) 140 provides an interface to I/O devices or peripheral components for the computer system 100. The ICH 140 may comprise any suitable interface controller to provide for any suitable communication link to the processor(s) 102, memory 132 and/or to any suitable device or component in communication with the ICH 140. For one embodiment of the invention, the ICH 140 provides suitable arbitration and buffering for each interface.

For one embodiment of the invention, the ICH 140 provides an interface to one or more suitable integrated drive electronics (IDE/ATA) drives 142, such as a hard disk drive (HDD), a compact disc read only memory (CD ROM) drive, or to suitable universal serial bus (USB) devices through one or more USB ports 144 (e.g., a flash memory drive). For one embodiment, the ICH 140 also provides an interface to a keyboard 151, a mouse 152, one or more suitable devices through one or more USB ports 153 (e.g., a printer), and one or more suitable devices through one or more Firewire ports 154. For one embodiment of the invention, the ICH 140 also provides a network interface 156 though which the computer system 100 can communicate with other computers and/or devices.

In one embodiment, the computer system 100 includes a machine-readable medium that stores a set of instructions (e.g., software) embodying any one, or all, of the methodologies described herein. Furthermore, software can reside, completely or at least partially, within memory 132 and/or within processor(s) 102.

System Level Overview

This section provides a system level overview of exemplary embodiments of the invention. In one embodiment, the configurable offline data store includes software for managing locally stored records, so that the local data store contains up-to-date copies of records from one or more server-based data stores. According to one embodiment, during certain record access operations, reasonably anticipated records are fetched and stored along with requested records. The locally stored records are updated when they are out-of-date or when a change is made to associated remotely stored records. In one embodiment, the local data store will not operate with certain directories, as it is bound to particular directories.

Figure 2:
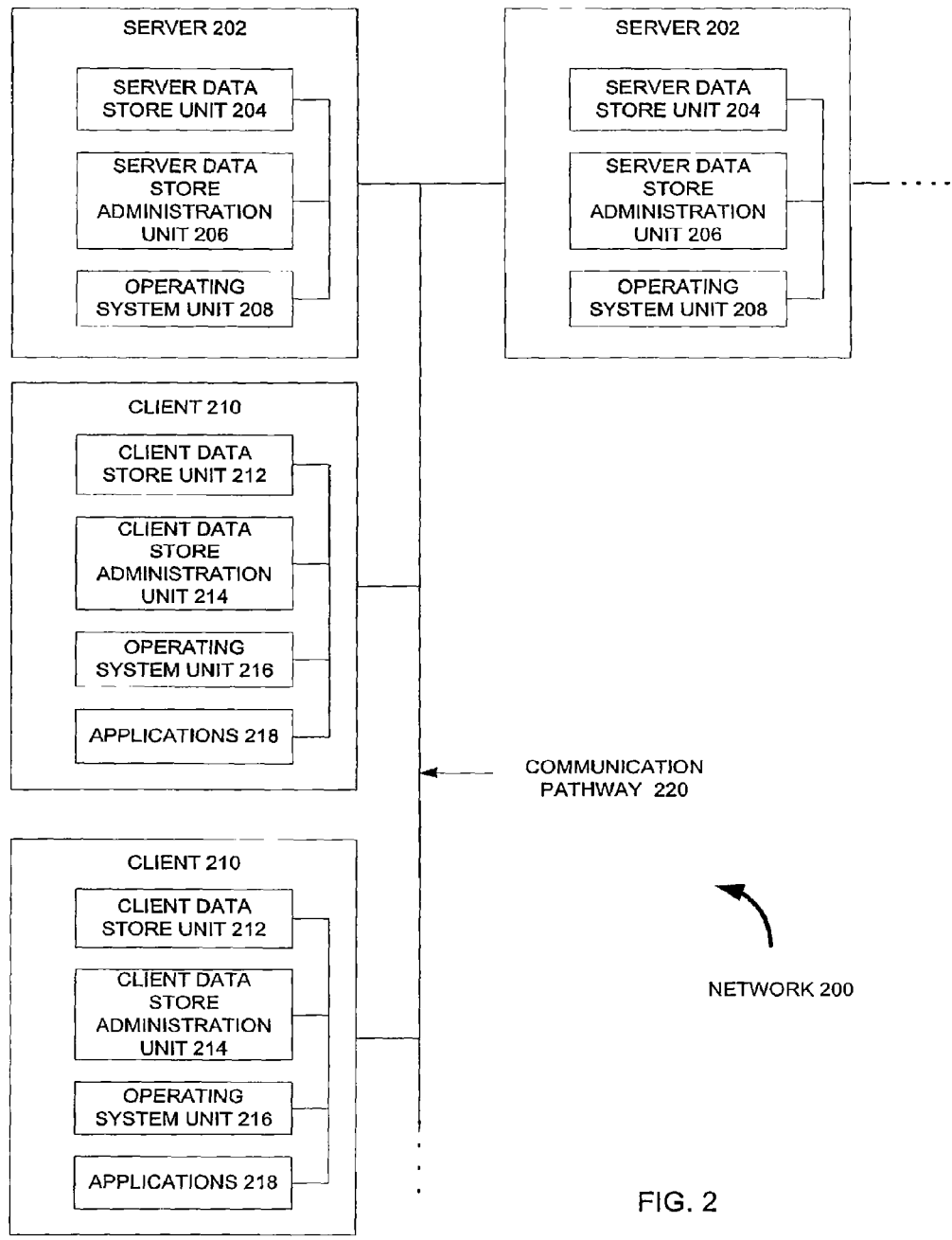
FIG. 2 is a block diagram illustrating an exemplary architecture for a configurable offline data store unit, according to embodiments of the invention.

FIG. 2 is a block diagram illustrating an exemplary architecture for a configurable offline data store unit, according to embodiments of the invention. FIG. 2 shows a network 200 including servers 202 and clients 210 joined over a communication pathway 220.

The server 202 includes a server data store unit 204. In one embodiment, the server data store unit 204 includes a database (not shown). The database can be a directory database, relational database, or other hierarchical database, according to embodiments of the invention. The database stores records used by various components of the network 200 (e.g., the clients 210). In this description, the terms records and data records may be used interchangeably.

The server 202 also includes a server data store administration unit 206 connected to the server data store unit 204. The server data store administration unit 206 retrieves and stores records and/or other data in the server data store unit 204. In one embodiment, the server data store administration unit 206 fetches and stores records in the server data store unit 204, as described in further detail below (see the Methods section). Additionally, the server 202 includes an operating system unit 208, which is connected to the server data store administration unit 206. As shown in FIG. 2, the units of the server 202 are connected through a common communication pathway 220.

As indicated above, the network 200 includes a client 210. The client 210 includes a client data store unit 212 for storing records used by various components of the network 200. The records stored in the client data store unit 212 are similar to those described above, with reference to the server data store unit 204 (see FIGS. 3A-3B and discussion above). The client 210 also includes a client data store administration unit 214, which fetches and stores records in the client data store unit 212, as described in greater detail below (see the Method section). Additionally, the client 210 includes an operating system unit 216 and applications 218. In one embodiment, the applications 218 include savvy applications and non-savvy applications. Savvy applications are applications that can access the client data store unit 212 when the client 210 has an operational server connection (e.g., when the client 210 can access the server 202 over a network connection). Non-savvy applications are those that cannot access the client data store unit 212 when the client 210 has an operational server connection. As shown in FIG. 2, the client units are connected with a common communication pathway 220. In one embodiment, the client units are connected by a network connection while in other embodiments they are connected by a bus or other suitable connection. The client 210 may be implemented using any suitable hardware and/or software, such as a personal computer or other electronic computing device. Portable computers, laptop or notebook computers, PDAs (Personal Digital Assistants), two-way alphanumeric pagers, keypads, portable telephones, pocket computers, and mainframe computers are examples of other possible configurations of the client 210.

Although the components of the network 200 are depicted as being connected over a common communication pathway 220, alternative embodiments call for alternative connectivities (e.g., the clients 210 and servers 202 may be fully connected or connected according to cube or ring architectures). Moreover, additional embodiments call for various communication methods such as message passing, handshaking, and/or communications via network protocols such as TCP/IP. Additionally, it should be understood by those of ordinary skill in the art that both server units (e.g., the server data store unit 204 and the server data store administration unit 206) and client units (e.g., the client data store unit 212 and the client data store administration unit 214) can be subdivided or combined to provide the functionality described herein.

In embodiments of the invention, the server and client units can be various processors, application specific integrated circuits (ASICs), memories, and/or machine-readable media for performing operations according to embodiments of the invention. Machine-readable media includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.). In one embodiment, the units of the server and the units of the client 210 are machine-readable media executing on a processor to carryout the operations described herein. However, in alternative embodiments, the server and client units are other types of logic (e.g., digital logic) for executing the operations described herein. The operations of these units are described in further detail below.

Figure 3A:
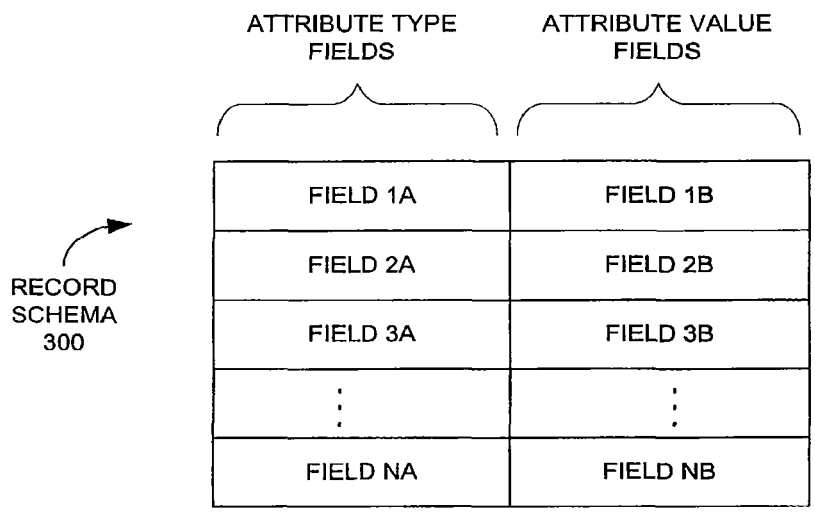
FIG. 3A is a block diagram illustrating an exemplary record schema, according to embodiments of the invention.
Figure 3B:
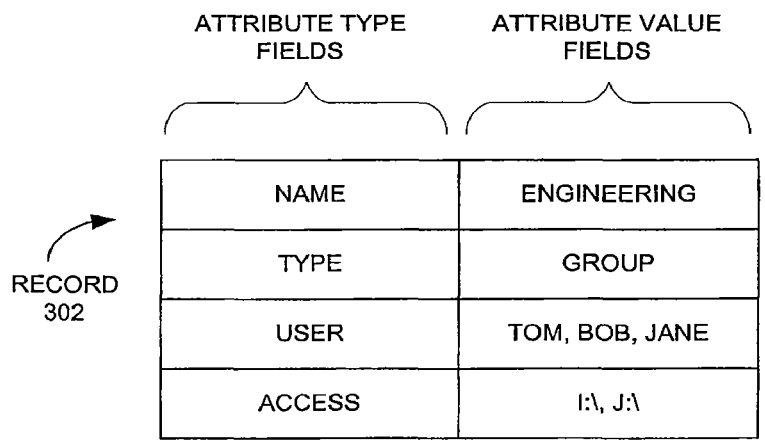
FIG. 3B is a block diagram illustrating an exemplary record, according to embodiments of the invention.

As noted above, in certain embodiments, both the client data store unit 212 and the server data store unit 203 include databases for storing records. In one embodiment, the data stores can store records of various types, including user-defined record types. FIG. 3A is a block diagram illustrating an exemplary record schema, according to embodiments of the invention. As shown in FIG. 3A, the record schema 300 includes attribute type fields and attribute value fields. In particular, the attribute type fields include fields 1A-NA, while the attribute value fields include fields 1B-NB. FIG. 3B is a block diagram illustrating an exemplary record 302, according to embodiments of the invention. In one example, the attribute fields of record 302 include the following attribute types: Name, Type, User, and Access. The attribute value fields include the following attribute values: Engineering, Group, Tom, Bob, Jane, I:/ and J:/. Additional and/or different attribute types and attribute values are within the scope of the invention.

In one embodiment, the database of the server data store unit 204 includes records for storing management information. Management information includes a hierarchy of computer, user, location, and group records containing preference data. Alternatively, the management information can include any other appropriate hierarchy type. Preference data includes information about user preferences such as their preferred homepage, desktop arrangement, fonts, graphical user interface settings, etc. The management information can also include policy data, which includes rules for combining preference data in the hierarchy and resolving conflicts between preference data associated with different hierarchy levels. The management information can include both hardware and software settings.

In one embodiment, the management information is associated with other records (e.g., user records) stored in the database. By associating the management information records with other record types, users can be "managed" by indirect access to the management information. For example, a designated Web browser homepage (e.g., the homepage at www.apple.com) may be associated with both a computer record and other user records. That is, the designated Web browser homepage may be associated with all users of a particular computer and other particular users (who do not use that particular computer). As such, the particular computer sets any user's default Web browser homepage to the designated Web browser homepage when the user logs onto the computer (unless policy rules determine otherwise).

Figures 4, 5:
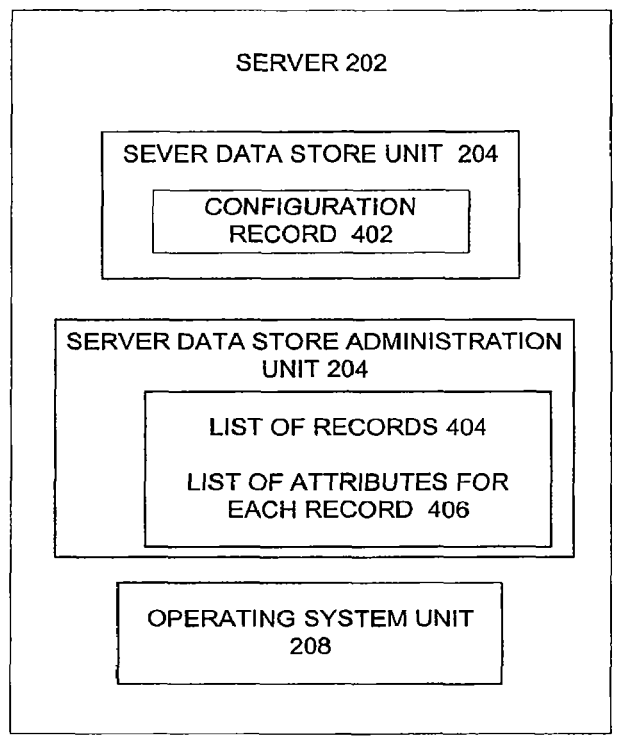
FIG. 4 is a block diagram illustrating an exemplary server configuration, according to embodiments of the invention.
FIG. 5 is a block diagram illustrating an exemplary configuration record, according to embodiments of the invention.

FIG. 4 is a block diagram illustrating a more detailed configuration of server 202, according to embodiments of the invention. In FIG. 4, the server data store unit 204 includes a configuration record 402 created by the server data store administration unit 204. The server 202 also includes an operating system unit 208. Additionally, the server's server data store administration unit 206 includes a list of record types 404 and a list of attribute types 406.

FIG. 5 is a more detailed block diagram illustrating an exemplary configuration record 402, according to embodiments of the invention. As shown in FIG. 5, the configuration record 402 includes the following attribute: Name, Type, Data_Store_Id, and Data_Store_Change_Id. The configuration record 500 also includes the following attribute values: mcx_cache, config, (unique string), and (unique string). In one embodiment, the "unique string" can be any unique character string.

Figure 6:
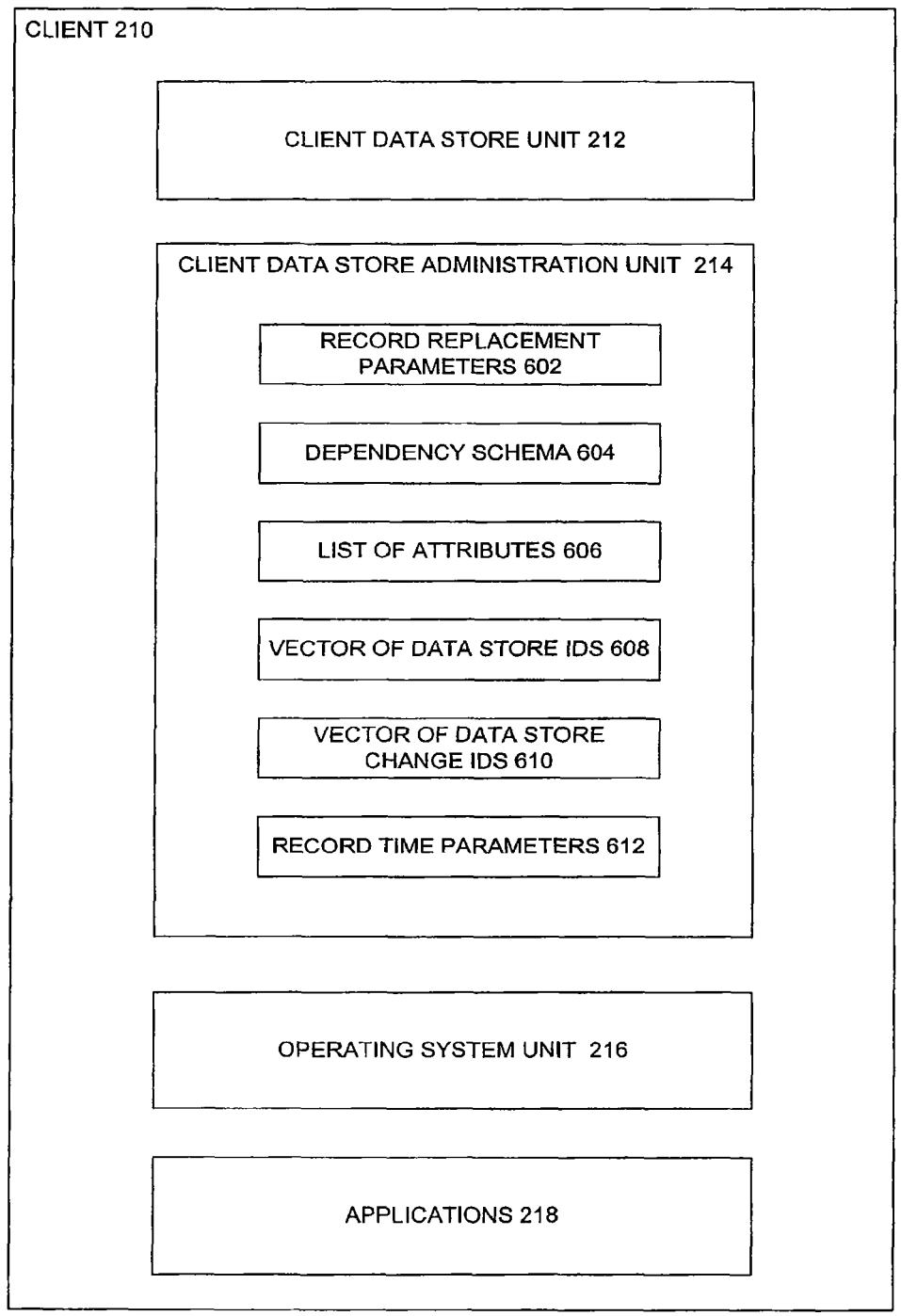
FIG. 6 is a block diagram illustrating an exemplary client configuration, according to embodiments of the invention.

FIG. 6 is a more detailed block diagram illustrating an exemplary configuration of the client 210, according to embodiments of the invention. As shown in FIG. 6, the client 210 includes a client data store unit 212 and a client data store administration unit 214. The client data store administration unit 214 includes record replacement parameters 602 and record time parameters 612. The client data store administration unit 214 also includes a vector of data store identifiers 608, wherein each data store identifier is a unique character string associated with a unique remote data store unit (e.g. a server data store unit 204). The client data store administration unit 214 also includes a vector of data store change identifiers 610, wherein each data store change identifier is a unique character string that is used to determine whether an associated record has been modified.

The client data store administration unit 214 also includes a dependency schema 604. In one embodiment, the dependency schema describes relationships between record types. In one embodiment, the dependency schema includes User, Computer, and Computer List as primary record types, while including Group as a dependent record type. In one embodiment, the dependency schema indicates the following dependency relationships:
- Group depends on User
- Group depends on Computer
- Group depends on Computer List The primary records are used to decide which records, of all possible records, should be fetched and stored in the client data store unit 212. Dependent record types are those to be fetched and stored in the client data store unit 212 based on their association with primary records. For example, "Group depends on User" (above) indicates that all Group records containing a reference to a given User record will be fetched and stored when the given User record is fetched and stored.

As noted above, the client data store administration unit 214 includes record replacement parameters 602 and record time parameters 612. The client data store administration unit 214 uses these parameters in determining whether to replace and/or delete records in the client data store unit 212. Additionally, the client data store administration unit 214 uses these parameters in determining whether to update certain data associated with the client data store unit 212 (e.g., the vector of data store identifiers 608 and the vector of data store change identifiers 610). As shown in FIG. 6, the client 210 also includes an operating system unit 216 and applications 218.

Methods of the Invention

This section describes methods performed by embodiments of the invention. In certain embodiments, the methods are performed by machine-readable media (e.g., software), while in other embodiments, the methods are performed by hardware or other logic (e.g., digital logic).

FIGS. 7-11 illustrate various aspects of embodiments of the invention. In particular FIGS. 7-10 focus on operations of a client (e.g. configuring a client, methods for updating and deleting client records, etc.) while FIG. 11 describes the general interaction between a client and server.

Figure 7:
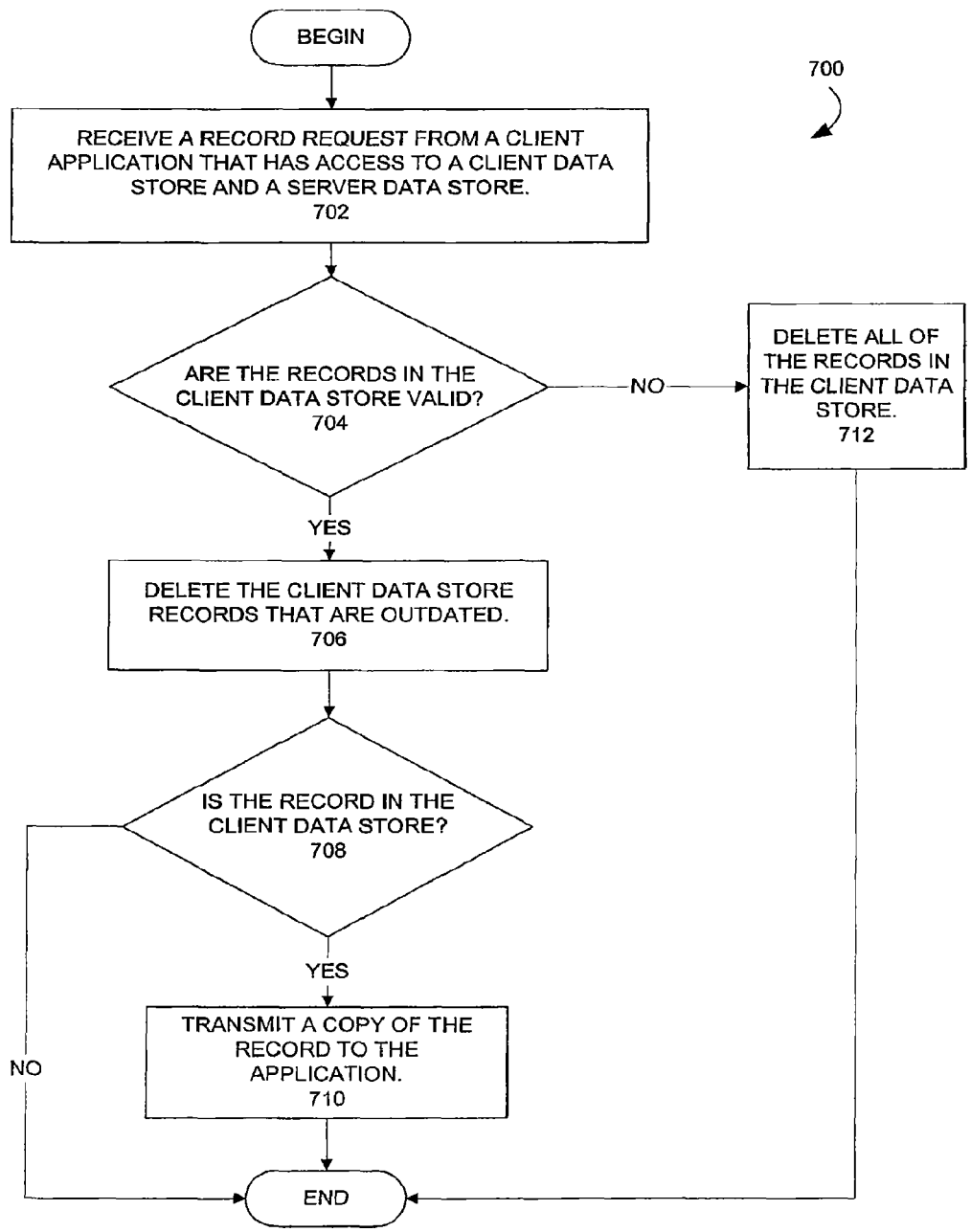
FIG. 7 is a high-level flow diagram illustrating operations for fetching and accessing records, according to embodiments of the invention.

FIG. 7 is a flow diagram illustrating operations for managing records in a client. The following discussion will describe how clients determine whether to retain or delete locally stored records. The flow diagram 700 begins at block 702. At block 702, a record request is received from a client application that has access to a client data store unit and a server data store unit. The process continues at block 704.

As shown in block 704, it is determined whether the records in the client data store unit are valid. According to embodiments of the invention, a record is valid if the same version of the record resides on both a server and a client. If the records are valid, the process continues at block 706. Otherwise, the process continues at block 712.

At block 712, all of the records in the client data store unit are deleted. From block 712, the process ends.

As shown in block 706, outdated client data store unit records are deleted. The process continues at block 708. At block 708, it is determined whether the record is in the client data store unit. If the record is in the client data store unit, the process continues at block 710. Otherwise the process ends. At block 710, a copy of the record is transmitted to the application. From block 710, the process ends.

Figure 8:
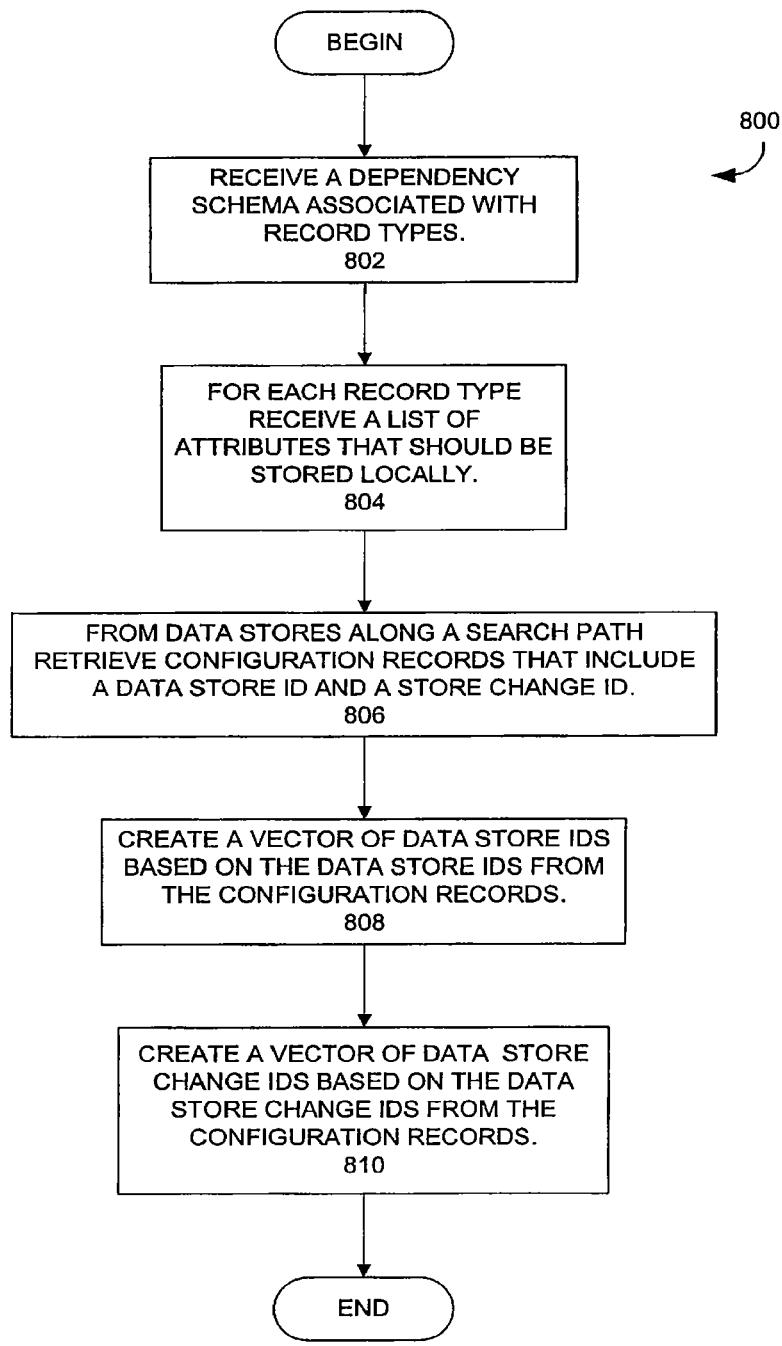
FIG. 8 is a high-level flow diagram illustrating operations for fetching and creating information used by a client 212 for determining whether locally stored records are outdated and/or valid, according to embodiments of the invention.

FIG. 8 is a high-level flow diagram illustrating operations for fetching and creating information used by a client 212 for determining whether locally stored records are outdated and/or valid, according to embodiments of the invention. The method described below is performed when a client is initialized for use.

The flow diagram 800 commences at block 802, wherein a dependency schema associated with record types is received. The process continues at block 804. At block 804, for each record type, a list of attributes to be stored locally is received. The process continues at block 806. At block 806, configuration records are retrieved from data stores along the search path. Process continues at block 808. At block 808, a vector of data store identifiers is created based on the data store identifiers from the configuration records. The process continues at block 810. At block 810, a vector of data store change identifiers is created based on the data store change identifiers from the configuration records. From block 810, the process ends.

Figure 9:
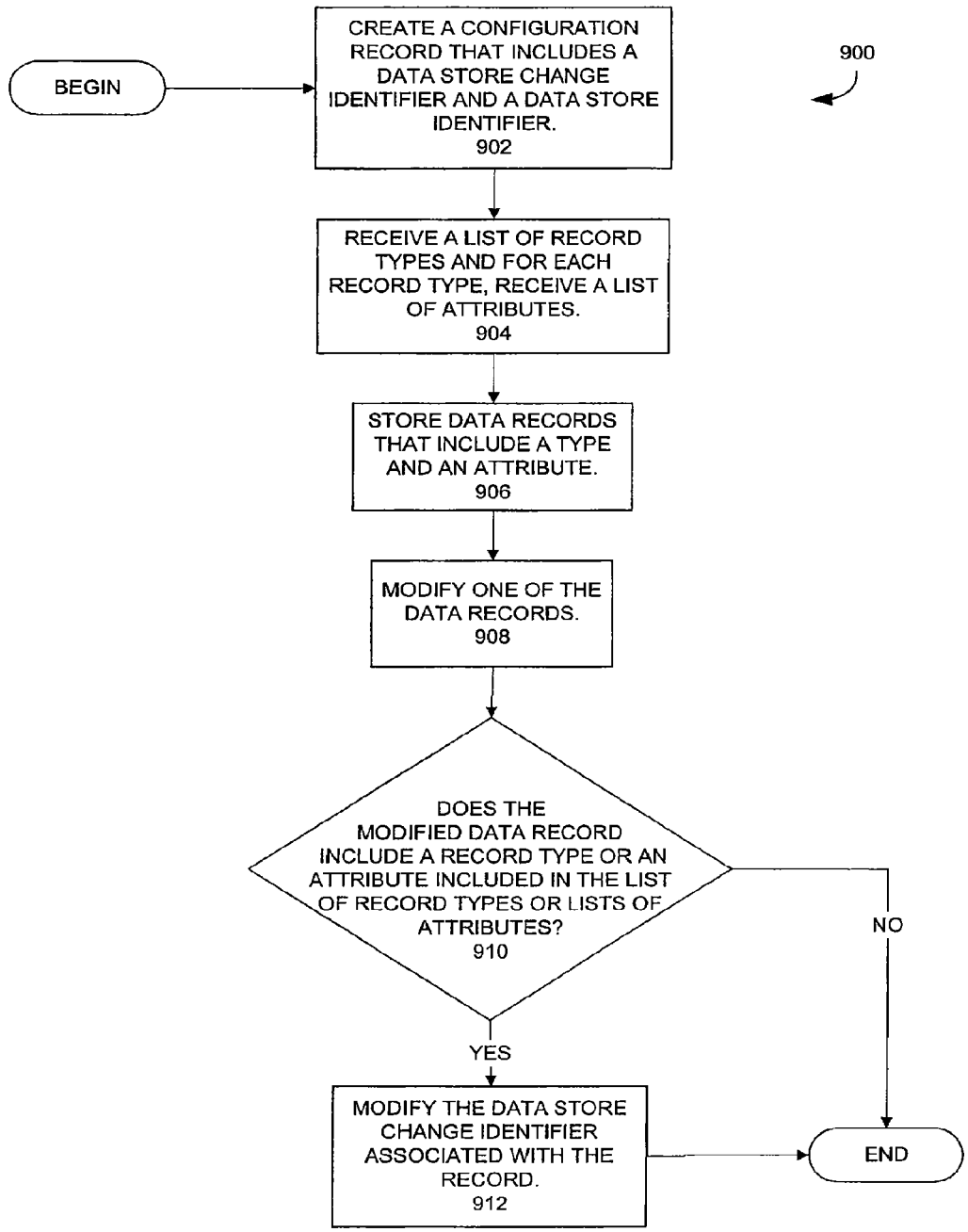
FIG. 9 is a high-level flow diagram for storing and modifying records on a server, according to embodiments of the invention.

FIG. 9 is a high-level flow diagram illustrating operations for determining whether to store records locally, modifying locally stored records on a server, and updating record parameters relating to the modified records, according to embodiments of the invention. In one embodiment, the server performs these operations in the course of servicing record requests. The flow diagram 900 commences at block 902, wherein a configuration record including a data store change identifier and a server data store identifier is created. The process continues at block 904. At block 904, a list of record types is received and for each record type, a list of attributes is received. The process continues at block 906. At block 906, data records that include a type and an attribute are stored. The process continues at block 908. At block 908, one of the data records is modified. The process continues at block 910. At block 910, it is determined whether the modified data record includes a record type or an attribute included in the list of record types or lists of attributes. If the modified data record is included in any of the lists, the process continues at block 912. Otherwise, the process ends. At block 912, the data store change identifier associated with the record is modified.

Figure 10:
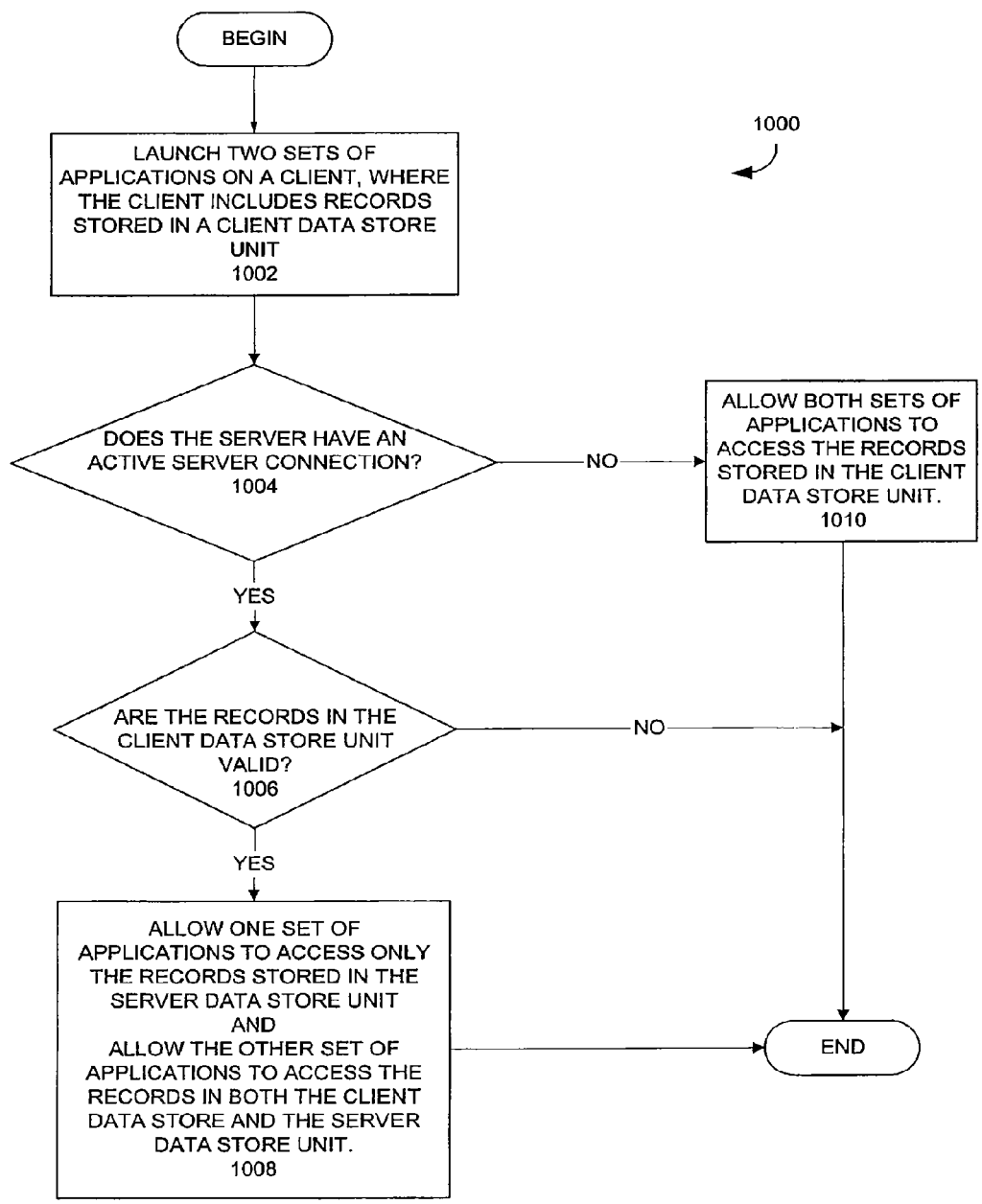
FIG. 10 is a high-level flow diagram for determining whether applications may access locally stored records, according to embodiments of the invention.

FIG. 10 is a high-level flow diagram for determining whether applications may access locally stored records, according to embodiments of the invention. In one embodiment, clients execute savvy and non-savvy applications. Savvy applications can access locally stored records to improve performance, while non-savvy applications can access locally stored records only in limited situations. The following discussion describes a technique used by clients to determine when savvy and non-savvy applications can access locally stored records. Flow diagram 1000 begins at block 1002. At block 1002, two sets of applications are launched on a client that includes a client data store unit and records stored in a client data store unit. The process continues at block 1004. At block 1004, it is determined whether the server has an active server connection. If there is an active server connection, the process continues at block 1006. Otherwise, the process continues at block 1010. At block 1010, both sets of applications are allowed to access records stored in the client data store unit. From block 1010, the process ends. At block 1006, it is determined whether the records are in the client data store unit are valid. If the records are valid, the process continues at block 1008. Otherwise, the process ends. At block 1008, one set of applications is allowed to access only the records stored in the server data store unit and the other set of applications is allowed to access the records in both the client data store unit and the server data store unit. From block 1008, the process ends.

Figure 11:
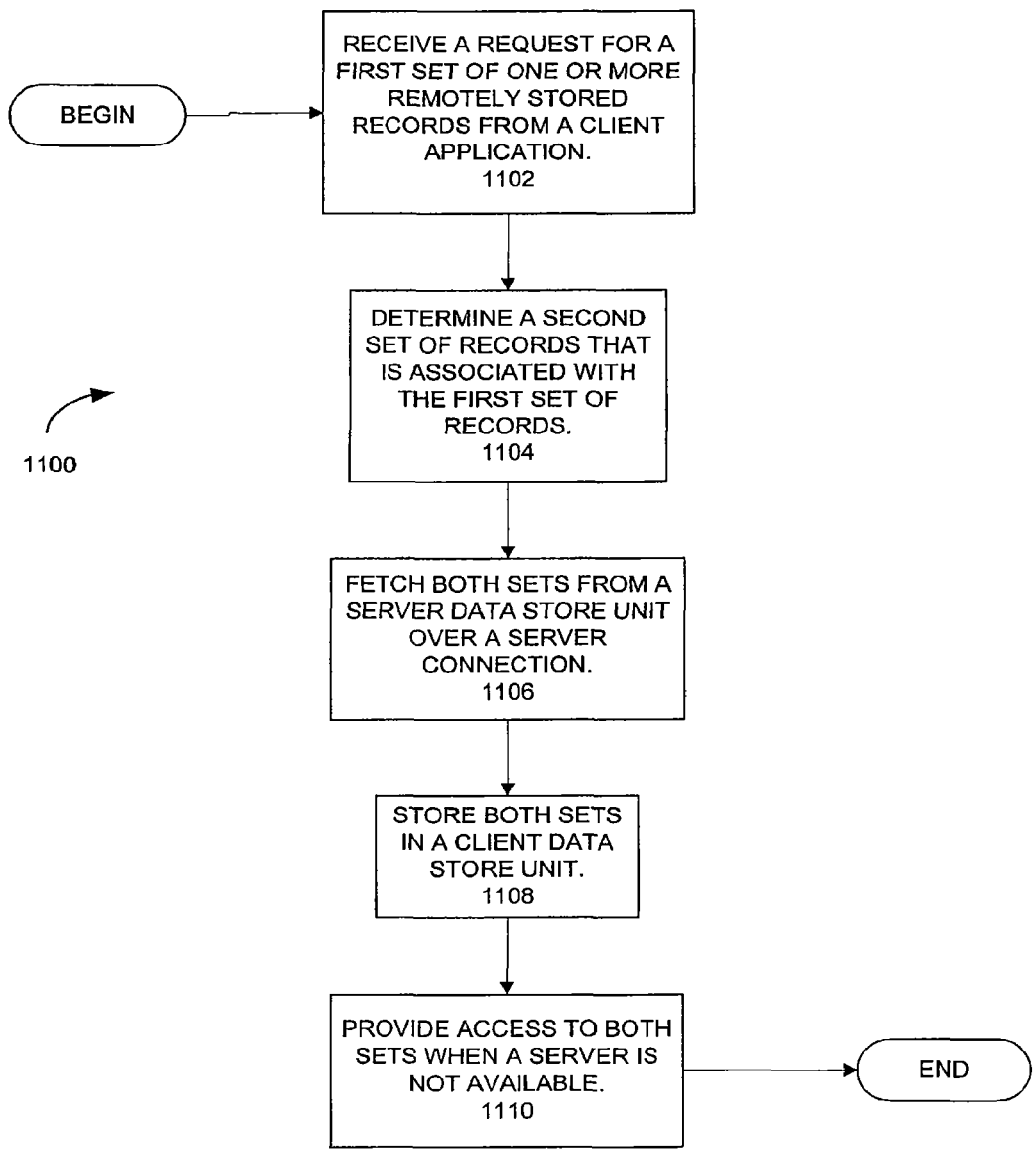
FIG. 11 is a high-level flow diagram for accessing records when a server is unavailable, according to embodiments of the invention.

FIG. 11 is a high-level flow diagram for accessing records when a server is unavailable, according to embodiments of the invention. The following discussion will describe operations for pre-fetching and locally storing certain records according to a dependency schema. The discussion will also describe providing how a client allows applications to access to locally stored records when a server connection is unavailable, according to embodiments of the invention. The flow diagram 1100 begins at block 1102. At block 1102, a request for a first set of one or more remotely stored records is received from a client application. The process continues at block 1104. At block 1104, a second set of records that is associated with the first set of records is determined. The process continues at block 1106. At block 1106, both sets are fetched from a server data store unit over a network connection. The process continues at block 1108. At block 1108, both sets are stored in a client data store unit. The process continues at block 1110. At block 1110, access to both sets is provided when a server is not available. From block 1110, the process ends.

In this section, exemplary methods were presented in conjunction with high-level flow diagrams. In the next section, additional methods will be presented in greater detail in conjunction with additional flow diagrams.

Exemplary Implementation

This section describes exemplary embodiments of the invention in greater detail. In one embodiment, these operations are performed by computer programs made up of computer executable instructions. In one embodiment, the computer programs may be pre-installed on a client and/or server computer systems. In an alternative embodiment, the computer programs are distributed on a computer-readable medium such as CD-ROM. In still another embodiment, the computer programs are downloaded and installed by an internet server.

FIGS. 12-17 describe operations performed by systems for managing client computers on a network. An example system for managing client computers on a network is described in U.S. patent application Ser. No. 10/194,926 "Managing Distributed Computers," filed on Jul. 12, 2002, and assigned to Apple Computer. According to this example implementation, management information is stored in records on a server. Software on a client computer retrieves these records. On a client computer, certain application retrieval requests are first directed a configurable offline directory data store (e.g., a client data store unit 214) on the client computer. If the client computer is a mobile computer that disconnects from the network or is for any other reason unable to establish access with a server, the client computer can still access the management information from the configurable offline data store on the client computer.

Figure 12:
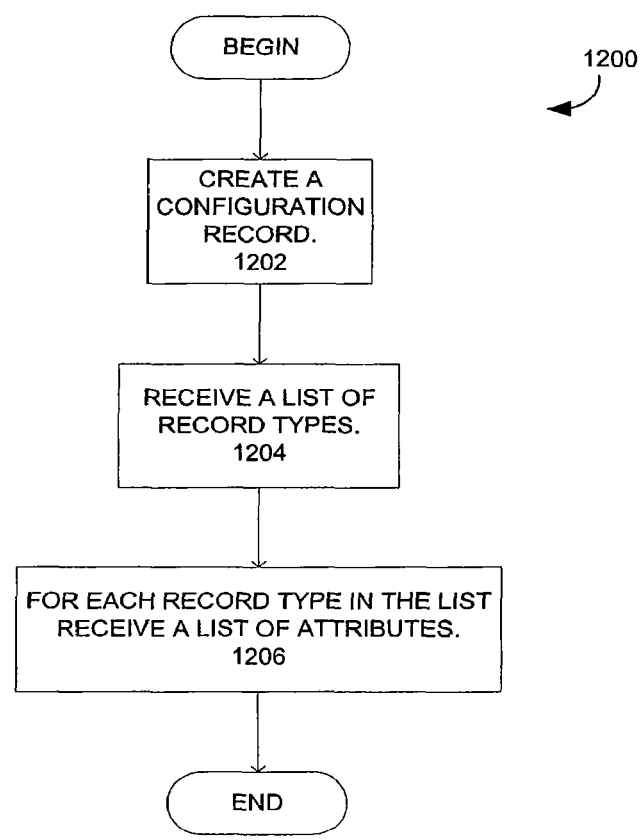
FIG. 12 is a flow diagram illustrating operations for configuring a server, according to embodiments of the invention.
Figure 13:
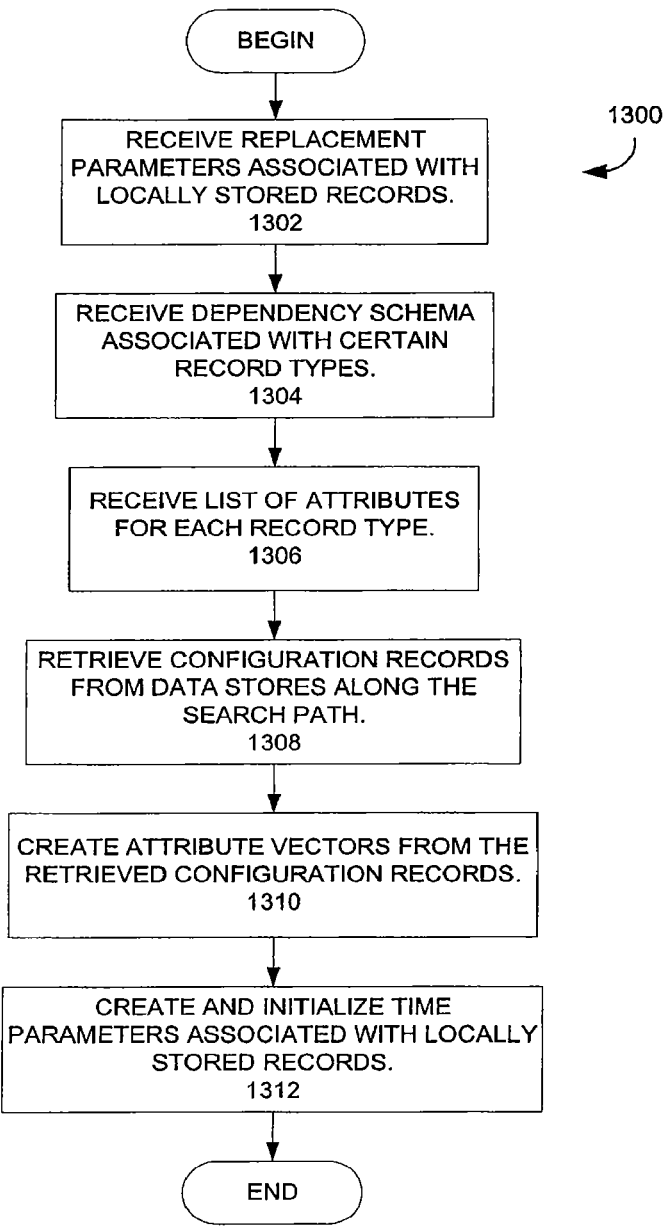
FIG. 13 is a flow diagram illustrating operations for configuring a client, according to embodiments of the invention.
Figure 14:
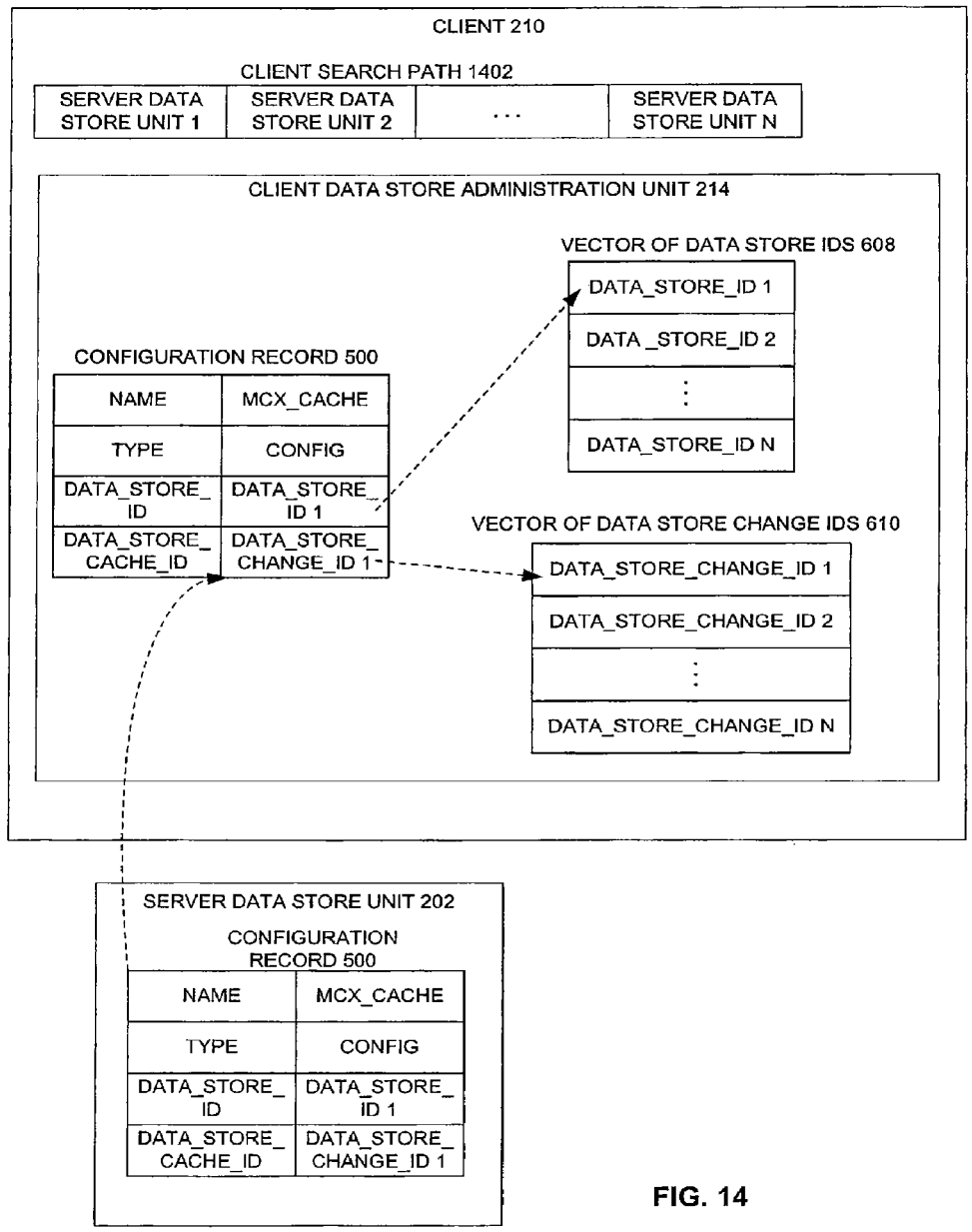
FIG. 14 is a block diagram illustrating data flow associated with creating attribute vectors, according to embodiments of the invention.
Figure 15:
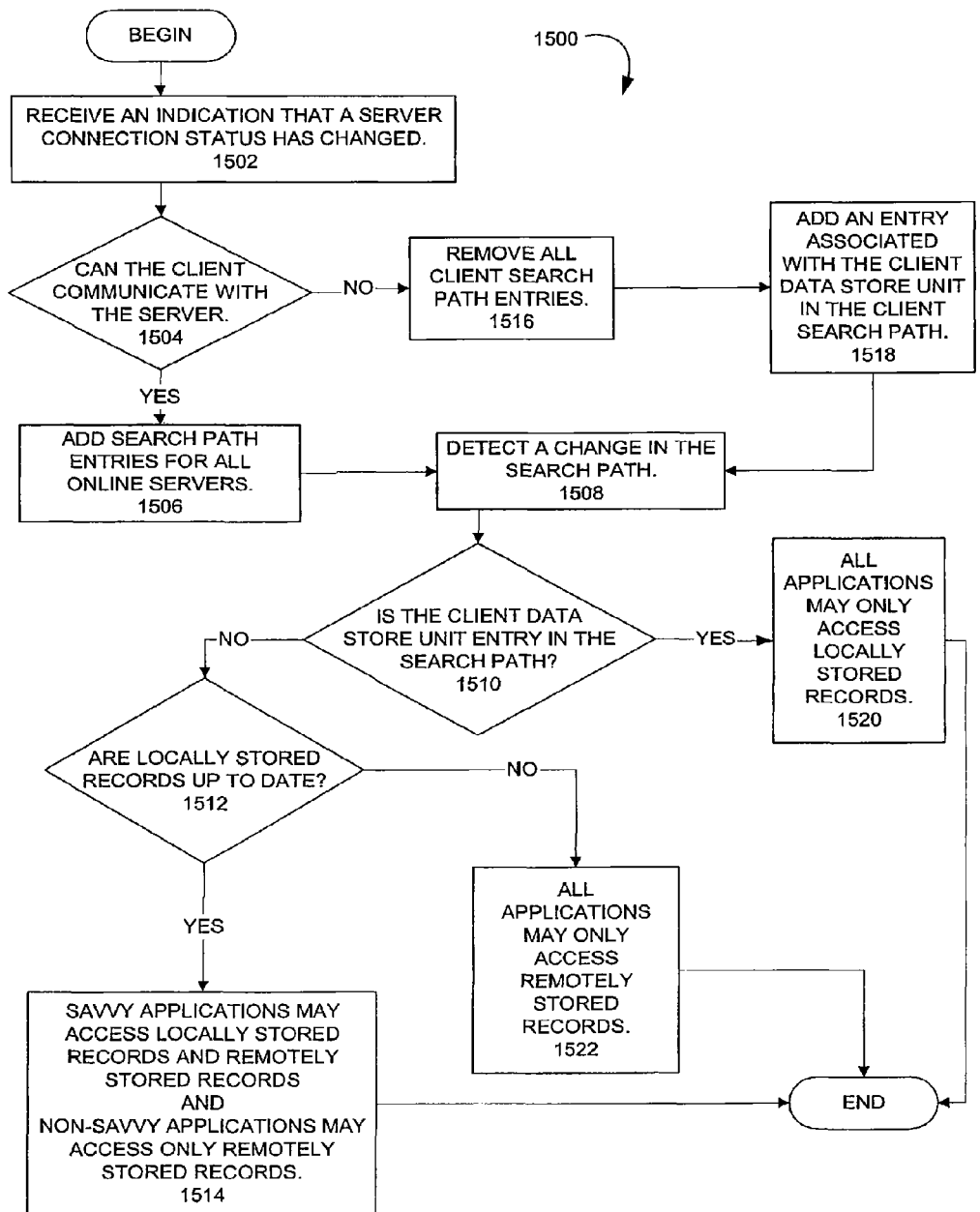
FIG. 15 is a flow diagram illustrating operations for determining whether client applications have access to locally stored records, according to embodiments of the invention.
Figure 16:
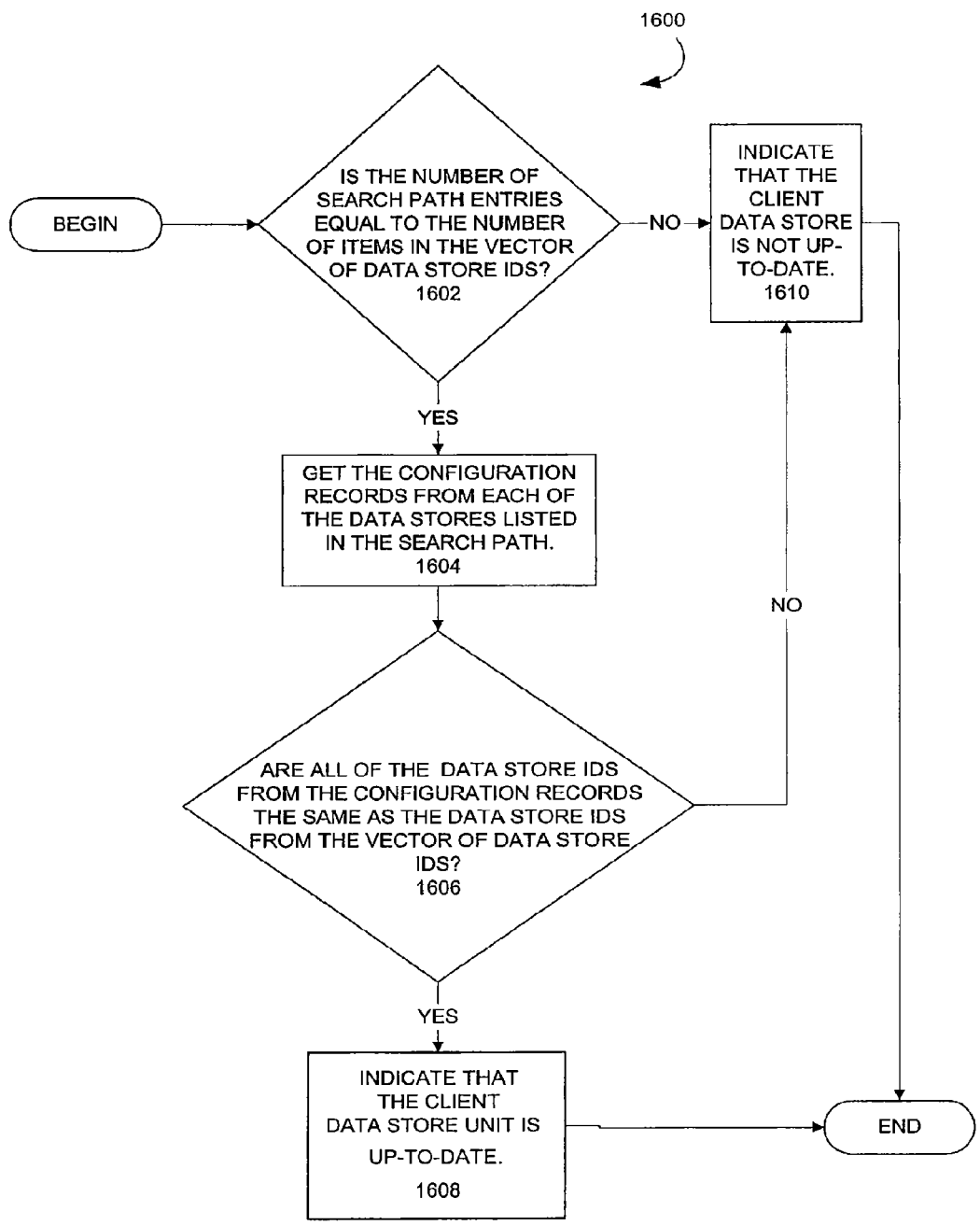
FIG. 16 is a flow diagram illustrating operations for determining whether locally stored records are up-to-date, according to embodiments of the invention.
Figure 17:
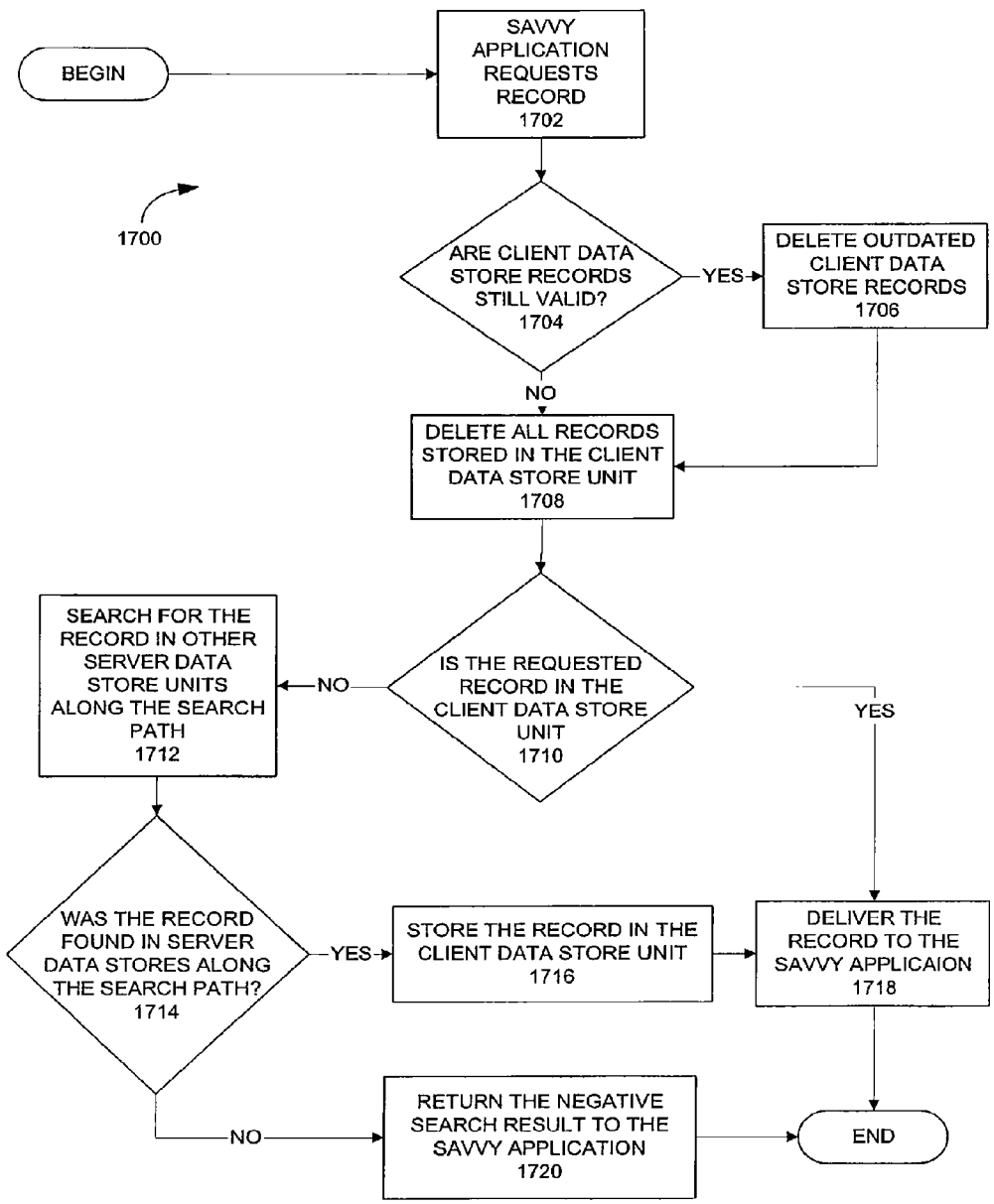
FIG. 17 is a flow diagram illustrating operations for a savvy application accessing locally stored records, according to embodiments of the invention.

FIGS. 12-14 describe operations for configuring a client and a server, while FIGS. 15-17 describe operations for retrieving locally and remotely stored records and maintaining record information.

FIG. 12 is a flow diagram illustrating operations for configuring a server, according to embodiments of the invention. The flow diagram 1200 of FIG. 12 will be described with reference to the exemplary embodiments shown in FIGS. 4-5.

The flow diagram 1200 commences at block 1202, wherein a configuration record is created. For example, the server data store administration unit 206 creates a configuration record 402 (see FIG. 5 for an exemplary configuration record). The process continues at block 1204. In one embodiment the server data store administration unit 206 stores the configuration record in the server data store unit 204.

At block 1204, a list of record types is received. For example, the server data store administration unit 206 receives a list of record types. In one embodiment the list is received from the operating system unit 208. In alternative embodiment, the list of record types is received from a system administrator program. The process continues at block 1206.

At block 1206, a list of attribute types is received for each record type in the list of record types. For example, the server data store administration unit 206 receives a list of attribute types. In one embodiment, if any of the listed attributes are modified in any of the listed record types, the client 210 will update the data store change identifier associated with the modified record. From block 1206, the process ends.

FIG. 13 is a flow diagram illustrating operations for configuring a client, according to embodiments of the invention. The operations of the flow diagram 1300 will be described with reference to the exemplary client illustrated in FIG. 6. The flow diagram 1300 commences at block 1302, wherein replacement parameters associated with locally stored records are received. For example, the client data store administration unit 214 receives replacement parameters associated with records stored in the client data store unit 212. In one embodiment, the replacement parameters are maximum_data_store_id_lifetime and maximum_record_lifetime. The maximum_data_store_id_lifetime is a numeric value indicating how often the client data store administration unit 214 should check for changes in the configuration records of the server data store units 204 in its search path. A search path is a list of data store addresses that is used to search for records. Typically, maximum_data_store_id_lifetime has a value of several hours. The maximum_record_lifetime is the maximum time that a record should be held in the client data store unit 212. Typically, maximum_record_lifetime has a value of several days. The process continues at block 1304.

As shown in block 1304, a dependency schema associated with certain record types is received. For example, the client data store administration unit 214 receives a dependency schema associated with certain record types. In one embodiment, the dependency schema is the one described above in the discussion of FIG. 6. Alternative embodiments use different dependency schemas (e.g., different record types correspond to the primary and dependent record types). The process continues at block 1306.

At block 1306, a list of attributes for each record type is received. For example, the client data store administration unit 214 receives a list of attributes for each record type. In one embodiment, the list of attributes is used in determining which records are to be stored in the client data store unit 212. In one embodiment, the list includes the following attributes: kDSNAttrRecordName, kDS1AttrDistinguishedName, kDS1AttrUniqueID, kDS1AttrPrimaryGroupID, kDS1AttrNFSHomeDirectory, kDS1AttrMetallodeLocation, kMCX1AttrMCXFlags, and kMCX1AttrMCXSettings. In one embodiment, these attributes are associated with management information. The process continues at block 1308.

At block 1308, configuration records from data stores along the search path are retrieved. For example, the client data store administration unit 214 retrieves the configuration records (see FIG. 5 for an exemplary configuration record) stored in data stores along its search path. The process continues at block 1310.

As shown in block 1310, attribute vectors are created from the retrieved configuration records. For example, the client data store administration unit 214 creates attribute vectors from the retrieved configuration records. In one embodiment, the client data store administration unit 214 creates a vector of data store identifiers and a vector of data store change identifiers. FIG. 14 describes how the client data store administration unit 214 creates the attribute vectors. The process continues at block 1312.

FIG. 14 is a block diagram illustrating data flow associated with creating attribute vectors, according to embodiments of the invention. FIG. 14 shows a client 210 including a client search path 1402 and client data store administration unit 214. The client data store administration unit 214 includes a configuration record 500, a vector of data store identifiers 608, and a vector of data store change identifiers 610. A server data store unit 202 is also shown in FIG. 14. In one embodiment, the client data store administration unit 214 retrieves a configuration record 500 from the server data store unit 202. In FIG. 14, a broken arrow leading from the server data store's configuration record 500 into the client data store administration unit 214 illustrates this retrieval. After retrieving the configuration record 402, the client data store administration unit 214 creates a vector of data store identifiers 608 and a vector of data store change identifiers 610. The client data store administration unit 214 inserts the retrieved configuration record's data store identifier (illustrated as DATA_STORE_ID_1) into the vector of data store identifiers 608. The client data store administration unit 214 also inserts the retrieved configuration record's data store identifier (illustrated as DATA_STORE_CHANGE_ID_1) into the vector of data store change identifiers 610. This process is repeated for certain records stored in data store units along the client search path.

Referring back to FIG. 13, at block 1312, time parameters associated with locally stored records are created and initialized. For example, the client data store administration unit 214 creates and initializes time parameters associated with records stored in the client data store unit 212. In one embodiment, the time parameters include a parameter indicating the last time the vector of data store identifiers (see FIG. 15) was last updated (this parameter may be called the data store_identifier_check_time). In one embodiment, the time parameters also include a parameter indicating how often the records of the client data store unit 212 are checked to determine whether they are outdated (this parameter may be called a data_store_lifetime_chec_time). From block 1312, the process ends.

The discussion of FIGS. 12-14 above described operations for configuring a client and server. After the client and server are configured, they can store and retrieve records and maintain record information, as described below in FIGS. 15-17. In particular, FIGS. 15-16 describe methods for determining where applications may go to retrieve requested records, while FIG. 17 describes a method for savvy applications accessing a client data store unit and maintaining record information.

FIG. 15 is a flow diagram illustrating operations for determining whether client applications have access to locally stored records. The operations of the flow diagram 1500 will be described with reference to the exemplary embodiments shown in FIG. 2. The flow diagram 1500 commences at block 1502, wherein an indication that the server connection status has changed is received. For example, the client 210 receives an indication that the server connection status has changed. As a more specific example, the client 210 receives an indication that its connection with a server 202 has changed from operational to non-operational. The process continues at block 1504.

At block 1504, it is determined whether the client can communicate with the server. For example, the client data store administration unit 214 determines whether it could communicate with the server 202. If the client can communicate with the server, the process continues at block 1506. Otherwise, the process continues at block 1516.

At block 1506, search path entries are added for all online servers. For example, the client data store administration unit 214 adds entries into its search path for all servers 202 with which it can communicate. From block 1506, the process continues at block 1508.

At block 1516, all client search path entries are removed. For example, the client data store administration unit 214 removes all entries from its search path. The process continues at block 1518.

As shown in block 1518, an entry associated with the client data store unit is added in the client search path. For example, the client data store administration unit 214 inserts an entry associated with the client data store 212 into its search path.

As shown in block 1508, a change in the search path is detected. For example, the client data store administration unit 214 detected changes in its search path. From block 1508, of the process continues at block 1510.

At block 1510, it is determined whether the client data store unit is an entry in the search path. For example, the client is store administration unit 214 determines whether the client data store 212 is in its search path. If the client data store unit is an entry in the search path, the process continues at block 1520. Otherwise, the process continues at block 1512.

At block 1520, it is determined that all applications may only access locally stored records. For example, all applications 218 (both savvy and non-savvy applications) can access records stored in the client data store unit 212. From block 1520, the process ends.

At block 1512, it is determined whether locally stored records are up-to-date. For example, the client data store administration unit 214 determines whether records in the client data store unit 212 are up-to-date. A method for determining whether the client data store unit 212 is up-to-date is described below in FIG. 16. If the records stored in the client data store unit 212 are up-to-date, the process continues at block 1514. Otherwise, the process continues at block 1522.

At block 1514, it is determined that savvy applications may access both locally and remotely stored records and it is determined that non-savvy applications may access only remotely stored records. For example the client data store administration unit 214 determines that savvy applications included in the applications 218 may access records in the both the client data store unit 212 and the server data store unit 204. Additionally the client data store administration unit 214 determines that non-savvy applications of the applications 218 may access only records stored on a server data store unit 204.

At block 1522, all applications may only access remotely stored records. For example, the client data store administration unit 214 may only access records remotely stored in a server data store 204. From block 1522, the process ends.

As noted above, the operations shown in FIG. 16 further describe the operation at block 1512 of FIG. 15. FIG. 16 is a flow diagram illustrating operations for determining whether locally stored records are up-to-date. The operations of flow diagram 1600 will be described with reference to the exemplary client shown in FIG. 6. The flow diagram 1600 commences at block 1602, wherein it is determined whether the number of search path entries equals the number of items in the vector of data store identifiers. For example, the client data store administration unit 214 compares the number of search path entries to the number of items in the vector of data store identifiers 608. If the number of search path entries equals the number of items in the vector of data store identifiers 608, the process continues at block 1604. Otherwise, the process continues at block 1610.

At block 1610, an indication that the client data store unit is not up-to-date is given. For example, the client data store administration unit 214 indicates that the records in the client data store unit 212 are not up-to-date. In one embodiment, the client data store administration unit 214 sets a flag (e.g., a bit) to indicate that the records in the client data store unit 212 are out-of-date. From block 1610, the process ends.

At block 1604, the configuration records from each of the data stores listed in the search path are fetched. For example, the client data store administration unit 214 fetches (along its search path) the configuration records associated with each record stored in the client data store unit 212. These configuration records are fetched from the server data store unit 204. The process continues at block 1606.

At block 1606, it is determined whether all of the data store identifiers from the configuration records are the same as those in the vector of data store identifiers. For example, the client data store administration unit 214 compares the data store identifiers of the configuration records to those of the vector of data store identifiers 608. If the data store identifiers match, the process continues at block 1608. Otherwise the process continues at block 1610.

At block 1608, an indication that the client data store is up-to-date is given. For example, the client data store administration unit 214 indicates that records in the client data store unit 212 are up-to-date. In one embodiment, the client data store administration unit 214 sets a flag (e.g., a bit) to indicate that the records in the client data store 212 are up-to-date. From block 1608, the process ends.

While FIGS. 15-16 described operations for determining where applications may access records, FIG. 17 describes operations for a savvy application accessing locally stored records. In particular, FIG. 17 is a flow diagram illustrating operations for a savvy application accessing locally stored records. The operations of the flow diagram 1700 will be described with reference to the exemplary embodiment shown in FIG. 2. The flow diagram 1700 commences at block 1702, wherein a savvy application requests a record. For example, a savvy application included in the applications 218 requests a record from the client data store administration unit 214. The process continues at block 1704.

At block 1704, it is determined whether client data store records are valid. For example, the client data store administration unit 214 determines whether records in the client data store unit 212 are valid. According to embodiments of the invention, a record is valid if the same version of the record resides on both a server and a client. If the client's records are valid, control continues at block 1708. Otherwise, the process continues at block 1706.

At block 1706, outdated client data store records are deleted. For example, the client data store administration unit 214 deletes outdated records from the client data store unit 212. In one embodiment, the client data store administration unit 214 determines whether records are out-of-date by comparing the data stored change identifiers stored in the vector of data stored change identifiers with those stored in the configuration records of the servers 202. The process continues at block 1708.

At block 1708, all records stored in the client data store unit are deleted. For example, the client data store administration unit 214 deletes all records stored in the client data store unit 212. The process continues at block 1710.

At block 1710, it is determined whether the requested record is in the client data store unit. For example, the client data store administration unit 214 determines whether the requested record resides in the client data store unit 212. If the requested record is not in the client data store unit 212, the process continues at block 1712. Otherwise, the process continues at block 1718.

At block 1718, the requested record is delivered to the savvy application. For example, the client data store administration unit 214 fetches the requested record and transmits it to the savvy application. From block 1718, the process ends.

At block 1712, the record is searched for in other server data store units along the search path. For example, the client data store administration unit 214 searches for the requested record in server data store units 204 along the search path. In one embodiment, client data stored administration unit 214 searches the servers 202 by sending request signals, data packets, or other suitable network request messages. The process continues at block 1714.

As shown in block 1714, is determined whether the record was found in a server data store unit along the search path. For example, the client data store administration unit 214 determines whether it found the record in a server data store unit 204 in the search path. In one embodiment, the client data store administration unit 214 receives a signal from server data store administration units 206 indicating whether the requested record was in a server's server data store unit 204. If the record was found, the process continues at block 1716. Otherwise the process continues at block 1720.

At block 1716, the record is stored in the client data store unit. For example, the client data store administration unit 214 stores the record in the client data store unit 212. In one embodiment, the client data store administration unit 214 stores the record in a database contained within the client data store unit 212. From block 1716, the process continues at block 1718.

At block 1718, the record is delivered to the savvy application. For example, the client data store administration unit 214 transmits the requested record to the savvy application. In one embodiment, the client data store administration unit 214 passes the operating system unit 216 a pointer to the record. In one embodiment, the operating system unit 216 provides the pointer to the savvy application. In an alternative embodiment, the client data store administration unit 214 provides a copy of the record to the operating system unit 216, which passes the copy on to the savvy application. In yet another alternative embodiment, the client data store administration unit 214 transmits the record directly to the savvy application.

At block 1720, a negative search result is returned to the savvy application. In one embodiment, for example, the client store administration unit 214 indicates to the operating system unit 216 that the record could not be found in the client's search path.

In turn, the operating system unit 216 transmits the negative search result to the savvy application. In an alternative embodiment, the client data store administration unit 214 reports the negative search result directly to the application. From block 1720, the process ends.

While the invention has been described above in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus, comprising:
   a processor; and
   a memory unit coupled to the processor, wherein the memory unit stores instructions that, when executed by the processor, cause the apparatus to implement:

a client data store unit configured to store a first set of records, wherein the first set of records includes primary types, and is associated with a second set of records that includes dependent record types, the second set of records being stored in a server data store, and a client data store administration unit coupled to the client data store unit, wherein the client data store administration unit manages a dependency schema that defines relationships between the first set of records and the second set of records.

2. The apparatus of claim 1, wherein the client data store administration unit is configured to fetch the second set of records in response to a request to retrieve the first set of records.

3. The apparatus of claim 2, wherein the client data store administration unit further manages a list of attributes for each record type, and wherein the client data store administration unit uses the list of attributes to determine which records are to be stored in the client data store unit.

4. The apparatus of claim 1, wherein the client data store administration unit is configured to pre-fetch and store the second set of records in the client data store unit.

5. The apparatus of claim 1, wherein the dependency schema includes "User," "Computer," and "Computer List" as primary record types, and "Group" as a dependent record type.

6. The apparatus of claim 1, wherein the client data store administration unit further manages a vector of data store change identifiers.

7. The apparatus of claim 1, wherein the client data store administration unit further manages a vector of data store identifiers, each data store identifier being unique to a respective remote data store unit.

8. The apparatus of claim 1, wherein the first set of records is a copy of the second set of records.

9. A method, comprising:
receiving a dependency schema that is associated with record types;
receiving, at a client, a list of attributes for each record type, wherein the list of attributes indicates particular records that are to be stored locally at the client;
retrieving, with a client store administration unit, a search path, wherein the search path comprises a list of addresses for a plurality of remote data stores;
retrieving, with the client store administration unit, configuration records from the plurality of remote data stores, wherein each configuration record includes a data store identifier that identifies one of the remote data stores and a data store change identifier that identifies whether an associated record has changed on the identified remote data store;
creating a vector of data store identifiers based on the data store identifiers of the configuration records; and
creating a vector of data store change identifiers based on the data store change identifiers of the configuration records.

10. The method of claim 9, wherein:
the dependency schema defines relationships between primary record types and dependent record types,
a first set of records includes records that are of a primary record type and a second set of records includes records that are of a dependent record type, and
each record included in the second set of records depends on a particular record included in the first set of records.

11. The method of claim 10, further comprising fetching, with the client data store administration unit, the second set of records in response to a request to retrieve the first set of records.

12. The method of claim 10, further comprising, with the client data store administration unit, pre-fetching the second set of records, and storing the second set of records locally at the client.

13. The method of claim 9, wherein each configuration record is associated with a different record.

14. The method of claim 9, further comprising:
determining whether a number of entries in the search path equals a number of items in the vector of data store identifiers; and
when the number of search path entries equals the number of items in the vector of data store identifiers:
retrieving the configuration records from the plurality of remote data stores along the search path.

15. The method of claim 9, further comprising, when an attribute is modified for a record: updating the data store change identifier associated with the modified record.

16. A non-transitory computer readable medium configured to store instructions that, when executed by a processor included in a computing device, cause the computing device to carry out steps that include:
receiving a dependency schema that is associated with record types;
receiving, at a client, a list of attributes for each record type, wherein the list of attributes indicates particular records that are to be stored locally at the client;
retrieving, with a client store administration unit, a search path, wherein the search path comprises a list of addresses for a plurality of remote data stores;
retrieving, with the client store administration unit, configuration records from the plurality of remote data stores, wherein each configuration record includes a data store identifier that identifies one of the remote data stores and a data store change identifier that identifies whether an associated record has changed on the identified remote data store;
creating a vector of data store identifiers based on the data store identifiers of the configuration records; and
creating a vector of data store change identifiers based on the data store change identifiers of the configuration records.

17. The non-transitory computer-readable storage medium of claim 16, wherein:
the dependency schema defines relationships between primary record types and dependent record types,
a first set of records includes records that are of a primary record type and a second set of records includes records that are of a dependent record type, and
each record included in the second set of records depends on a particular record included in the first set of records.

18. The non-transitory computer-readable storage medium of claim 17, further comprising fetching, with the client data store administration unit, the second set of records in response to a request to retrieve the first set of records.

19. The non-transitory computer-readable storage medium of claim 17, further comprising, with the client data store administration unit, pre-fetching the second set of records, and storing the second set of records locally at the client.

20. The non-transitory computer-readable storage medium of claim 16, further comprising:
determining whether a number of entries in the search path equals a number of items in the vector of data store identifiers; and when the number of search path entries equals the number of items in the vector of data store identifiers:
  retrieving the configuration records from the plurality of remote data stores along the search path.

* * * * *